United States Patent
Lundy et al.

(10) Patent No.: US 8,418,083 B1
(45) Date of Patent: Apr. 9, 2013

(54) APPLYING A NAVIGATIONAL MODE TO A DEVICE

(75) Inventors: Michael T. Lundy, Olathe, KS (US); Jason K. Whitney, Lees Summit, MO (US); Robert Brian Landers, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 756 days.

(21) Appl. No.: 11/945,054

(22) Filed: Nov. 26, 2007

(51) Int. Cl.
G06F 3/048 (2006.01)

(52) U.S. Cl.
USPC .......................................... 715/863; 715/810

(58) Field of Classification Search .................. 715/863, 715/810
See application file for complete search history.

(56) References Cited

U.S. PATENT DOCUMENTS

| | | | |
|---|---|---|---|
| 5,602,566 A | 2/1997 | Motosyuku et al. | |
| 6,137,468 A | 10/2000 | Martinez et al. | |
| 6,163,312 A | 12/2000 | Furuya | |
| 6,201,554 B1 | 3/2001 | Lands | |
| 6,288,704 B1 | 9/2001 | Flack et al. | |
| 6,347,290 B1 | 2/2002 | Bartlett | |
| 6,400,376 B1 | 6/2002 | Singh et al. | |
| 6,433,793 B1 | 8/2002 | Ootsuka | |
| 6,466,198 B1 * | 10/2002 | Feinstein | 345/158 |
| 6,567,101 B1 | 5/2003 | Thomas | |
| 6,577,296 B2 | 6/2003 | Flack | |
| 6,798,429 B2 | 9/2004 | Bradski | |
| 6,847,351 B2 | 1/2005 | Noguera | |
| 7,002,553 B2 | 2/2006 | Shkolnikov | |
| 7,271,795 B2 | 9/2007 | Bradski | |
| 7,351,152 B2 | 4/2008 | Abe et al. | |
| 7,533,569 B2 | 5/2009 | Sheynblat | |
| 7,607,111 B2 | 10/2009 | Vaananen et al. | |
| 7,647,175 B2 | 1/2010 | Fateh | |
| 7,679,604 B2 | 3/2010 | Uhlik et al. | |
| 7,764,269 B2 | 7/2010 | Sohn et al. | |
| 7,827,698 B2 | 11/2010 | Jaiswal et al. | |
| 7,859,516 B2 | 12/2010 | Hanyu | |
| 2001/0048423 A1 | 12/2001 | Rekimoto | |
| 2002/0041291 A1 * | 4/2002 | Vale | 345/785 |
| 2002/0075335 A1 * | 6/2002 | Rekimoto | 345/864 |
| 2006/0164382 A1 * | 7/2006 | Kulas et al. | 345/156 |
| 2007/0066394 A1 | 3/2007 | Ikeda et al. | |
| 2007/0247439 A1 | 10/2007 | Daniel et al. | |
| 2009/0179857 A1 | 7/2009 | Hsu et al. | |
| 2010/0020102 A1 * | 1/2010 | Vaananen et al. | 345/659 |
| 2010/0053304 A1 * | 3/2010 | Underkoffler et al. | 348/42 |

OTHER PUBLICATIONS

"DoCoMo Phones Swing Wiimote-Style," Apr. 24, 2007, 1 page, www.cnet.co.uk/misc/print/0,39030763,49289918,00. htm.

(Continued)

*Primary Examiner* — Andrea Leggett

(57) ABSTRACT

Systems, methods, and computer-readable media, for applying a navigational mode to a device based on one or more state indicators is provided. One or more state indicators are obtained. The state indicators indicate the state of a navigational mode selector. Such a navigational mode selector may be utilized to alter the navigational mode applied to a device. Thereafter, the state indicators are associated with a navigational mode. Upon associating the state indicators with a navigational mode, the navigational mode is applied to a device so that a display screen feature may be effectively manipulated.

19 Claims, 17 Drawing Sheets

OTHER PUBLICATIONS

"Samsung Introduces New Motion Recognition Phone," PHYSORG.com, Dec. 3, 2005, 1 page, www.physorg.com/news8705.html.

Jingtao Wang et al., "Camera Phone Based Motion Sensing: Interaction Techniques, Applications and Performance Study," UIST '06, Oct. 15-18, 2006, Montreux, Switzerland, 10 pp.

First Action Interview Pilot Program Pre-Interview Communication, mailed Sep. 16, 2011, in U.S. Appl. No. 12/323,258, 6 pp.

First Action Interview Pilot Program Pre-Interview Communication, mailed Sep. 29, 2011, in U.S. Appl. No. 12/323,249, 7 pp.

First Action Interview Pilot program Pre-Interview Communication, mailed Sep. 16, 2011, in U.S. Appl. No. 12/323,258 (6 pp.).

First Action Interview Pilot program Pre-Interview Communication, mailed Sep. 29, 2011, in U.S. Appl. No. 12/323,249 (7 pp.).

First Action Interview Office Action Summary, mailed Dec. 28, 2012, in U.S. Appl. No. 12/323,249 (3 pp).

Final Office Action, mailed Feb. 24, 2012, in U.S. Appl. No. 12/323,249 (28 pp.).

* cited by examiner

APPLYING A NAVIGATIONAL MODE TO A DEVICE

SUMMARY

This Summary is provided to introduce a selection of concepts in a simplified form that are further described below in the Detailed Description. Embodiments of the present invention are defined by the claims below. This Summary is intended to summarize embodiments of the invention and is not intended to limit the scope of the claims in any way.

In embodiments, one or more computer-readable media having computer-useable instructions embodied thereon for performing a method for applying navigational modes to devices based on state indicators are provided. The method includes obtaining one or more state indicators that provide an indication of a state of a navigational mode selector utilized to select a navigation mode, wherein the navigational mode comprises a distinct operation within a computer program that manipulates one or more display screen features; associating the one or more state indicators with the navigational mode; and applying the navigational mode to a device.

In other embodiments, a system for applying navigational modes to devices based on state indicators is provided. The system includes a state indicator obtaining component, a state indicator associating component, and a navigational mode applying component. The state indicator obtaining component is configured to obtain one or more state indicators that provide an indication of a state of a navigational mode selector utilized to select a navigational mode, wherein the navigational mode comprises a distinct operation within a computer program that manipulates one or more display screen features. The state indicator associating component is configured to associate the one or more state indicators with the navigational mode. The navigational mode applying component is configured to apply the navigational mode to a device.

In still further embodiments, a set of computer-useable instructions provide a method for applying navigational modes to devices based on state indicators. The method includes obtaining a first state indicator that indicates a first state of a navigational mode selector utilized to select a navigational mode, wherein the navigational mode comprises a distinct operation within a computer program that manipulates at least one display screen feature, the at least one display screen feature comprises a content display screen feature, a focus display screen feature, or a selector display screen feature; associating the first state indicator with a first navigational mode; applying the first navigational mode to a device; obtaining a second state indicator that indicates a second state of the navigational mode selector; associating the second state indicator with a second navigational mode; and applying the second navigational mode to the device.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
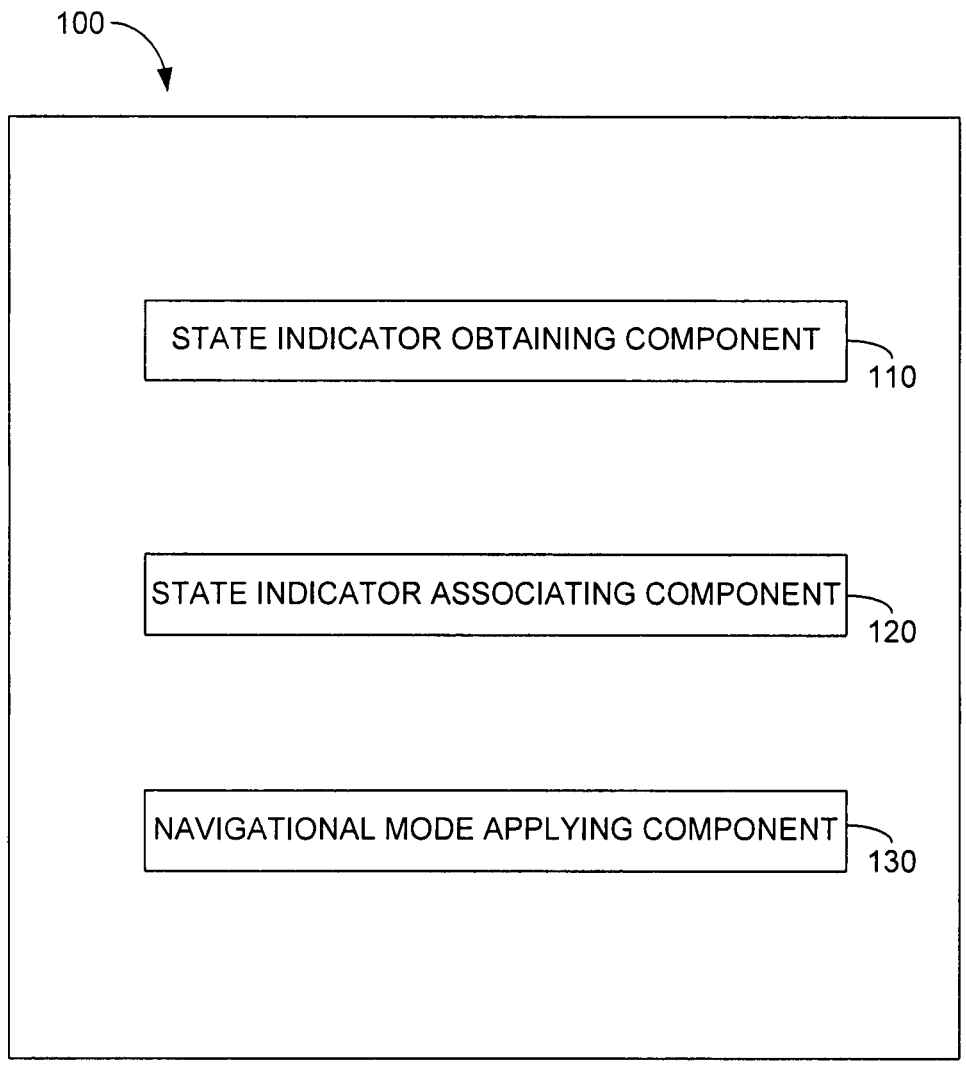
FIG. 1 is a block diagram of an exemplary computer system for applying a navigational mode to a device based on one or more state indicators, in accordance with an embodiment of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

Embodiments of the present invention provide systems, methods, and computer-readable media for applying a navigational mode to a device based on one or more state indicators. Utilizing embodiments hereof, a specific navigational mode desired by a user may be applied to a device. As such, a user may more effectively utilize motion to manipulate a display screen.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| CD | Compact Disk |
| CD-ROM | Compact Disk Read Only Memory |
| DVD | Digital Versatile Discs |
| EEPROM | Electrically Erasable Programmable Read Only Memory |
| MP3 | MPEG-1 Audio Layer 3 |
| PDA | Personal Digital Assistant |
| RAM | Random Access Memory |
| ROM | Read Only Memory |

As one skilled in the art will appreciate, embodiments of the present invention may be embodied as, among other things, a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Referring to the drawings generally, and initially to FIG. 1 in particular, an exemplary computer system 100 for applying a navigational mode to a device based on one or more state indicators is illustrated. A navigational mode, as used herein, refers to a distinct operation within a computer program that manipulates a display screen feature in accordance with one or more device motion events, one or more action events, of a combination thereof. A display screen feature may include any feature viewable within a display screen. In one embodiment, a display screen feature may be viewable within a display screen where the display screen feature is presented, in its entirety, within the display screen. Alternatively, a display screen feature may be viewable within a display screen where the display screen feature is displayed within the display screen or is capable of being displayed within the display screen upon manipulation.

A display screen feature may comprise, for example, a selector, focus, and/or content. A selector display screen feature refers to an aspect of the display screen that is used to select selectable items, e.g., hyperlinks. In one embodiment, a selector display screen feature may comprise a pointer or arrow. A focus display screen feature refers to any feature that focuses on, for example, content within the display screen. A content display screen feature may include any data viewable via a display screen including, among other things, text, a value, a figure, a symbol, a video, a photograph, a document, a webpage, a desktop, a list, contact information, or any other data. In one embodiment, a content display screen feature includes an entire document, photograph, webpage, desktop, list, and the like, even though the entire document may not be displayed within the display screen. For example, an entire document or webpage may comprise a content display screen feature even though the entire document or webpage may not be initially presented to the user within the display screen. Manipulating any such display screen features may include moving, rotating, shifting, focusing, zooming, and the like.

A device motion event may be any movement applied to and detected by a device or other equipment associated therewith, e.g., an earpiece, a microphone, and the like. A movement applied to a device, or other equipment associated therewith, may include, without limitation, a lateral movement; a vertical movement; a zoom movement, e.g., zoom in or zoom out; a forward movement; a backward movement; a rotational movement; a gesture, e.g., a brisk movement in a specific direction, a device shake, a movement in a specific pattern; and a combination thereof. A device motion event may be detected utilizing any technology including, for example, a motion sensor, e.g., an accelerometer or electronic compass; a global positioning system (GPS); a camera; hand jitter reduction technology; and the like. Such technology may detect a device motion event along an x, y, and/or z axis based on an actual motion or a relative motion of the device, e.g., motion of device relative to an object such as a vehicle.

A device action event may be any action applied to and detected by a device or other equipment associated therewith. An action applied to a device, or other equipment associated therewith, may include a selection of content presented within a display screen. Such a selection may occur based on a user's contact with a key, or the like, to select the content or based on another event, e.g., a selector hovers over a selectable content portion for a predetermined duration.

A device, as used herein, refers to any portable device associated with a display screen. Such a device may include, for example, a mobile phone, a personal digital assistant (PDA), a CD player, a MP3 player, a dictation device, a video player, a laptop, any combination of these devices, or any other portable device associated with a display screen. A display screen may be any screen or monitor that displays images, text, figures, values, symbols, videos, video clips, movies, photographs, lists, webpages, and the like. One skilled in the art will recognize that a display screen associated with a portable device may be remote from the portable device. In such a case, the display screen that is remote from the portable device may be manipulated in accordance with a movement applied to and detected by the portable device.

One skilled in the art will recognize that a navigational mode may comprise any mode that manipulates a display screen feature in accordance with one or more device motion events or one or more device action events. A navigational mode may comprise, for example, a focus navigational mode, a selector navigational mode, a content navigational mode, a discrete navigational mode, a continuous navigational mode, a static navigational mode, a menu navigational mode, a selection navigational mode, a tilt navigational mode, a rotational navigational mode, a gesture navigational mode, and the like, and a combination thereof. Such navigational modes enable a user to effectively manipulate a display screen feature so that the user may view and/or select content within the display screen.

Figure 2B:
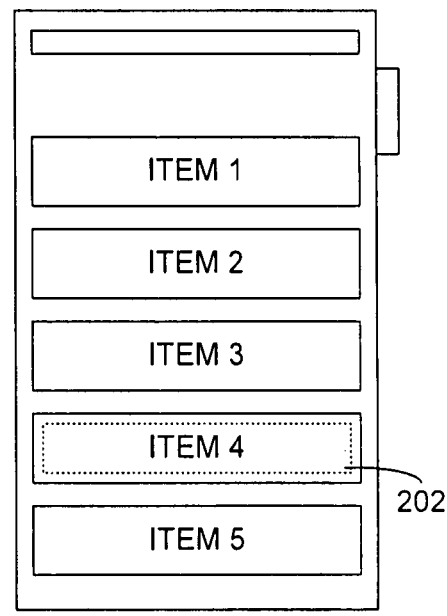
FIG. 2B is a second display of a graphical user interface for applying a focus navigational mode, in accordance with an embodiment of the present invention.
Figure 2A:
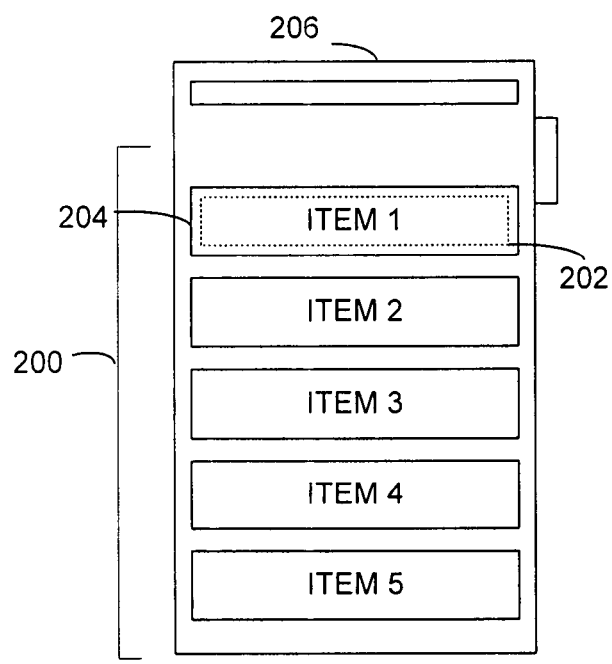
FIG. 2A is a first display of a graphical user interface for applying a focus navigational mode, in accordance with an embodiment of the present invention.

In one embodiment, a navigational mode may be based on a display screen feature, e.g., focus, selector, or content, maintaining in a virtually fixed position upon a device motion event. Accordingly, a navigational mode may comprise a focus navigational mode, a selector navigational mode, a content navigational mode, and the like. A focus navigational mode maintains a focus display screen feature in a virtually fixed position upon a device motion event. By way of example, with reference to FIG. 2A, a user views a content display screen feature 200 comprising a vertical list. A focus display screen feature 202 is focused on the first item 204 within the content display screen feature 200. Assume the device 206 is moved away from the user while a focus navigational mode is applied to device 206. As shown in FIG. 2B, the focus display screen feature 202 remains virtually fixed.

Figure 3A:
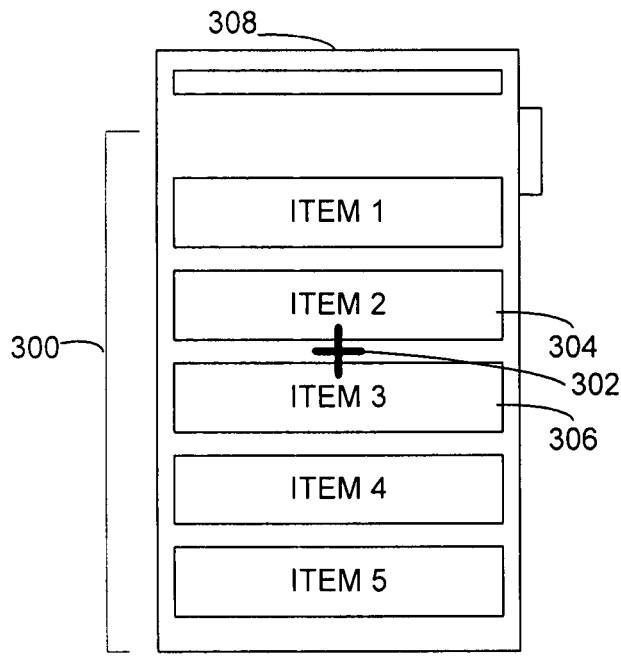
FIG. 3A is a first display of a graphical user interface for applying a selector navigational mode, in accordance with an embodiment of the present invention.
Figure 3B:
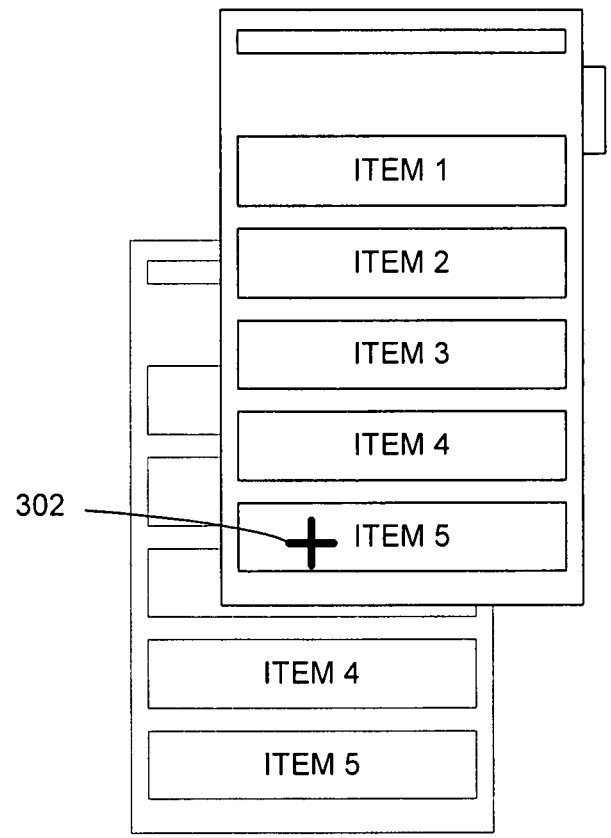
FIG. 3B is a second display of a graphical user interface, in accordance with an embodiment of the present invention, for applying a selector navigational mode.

A selector navigational mode maintains a selector display screen feature in a virtually fixed position upon a device motion event. By way of example, with reference to FIG. 3A, a user views a content display screen feature 300 comprising a vertical list. A selector display screen feature 302 is focused between the second item 304 and the third item 306 within the content display screen feature 300. Assume the device 308 is moved away from the user and to the right, i.e., on the x and y axis, while a selector navigational mode is applied to the device 308. As shown in FIG. 3B, the selector display screen feature 302 remains virtually fixed.

Figure 4A:
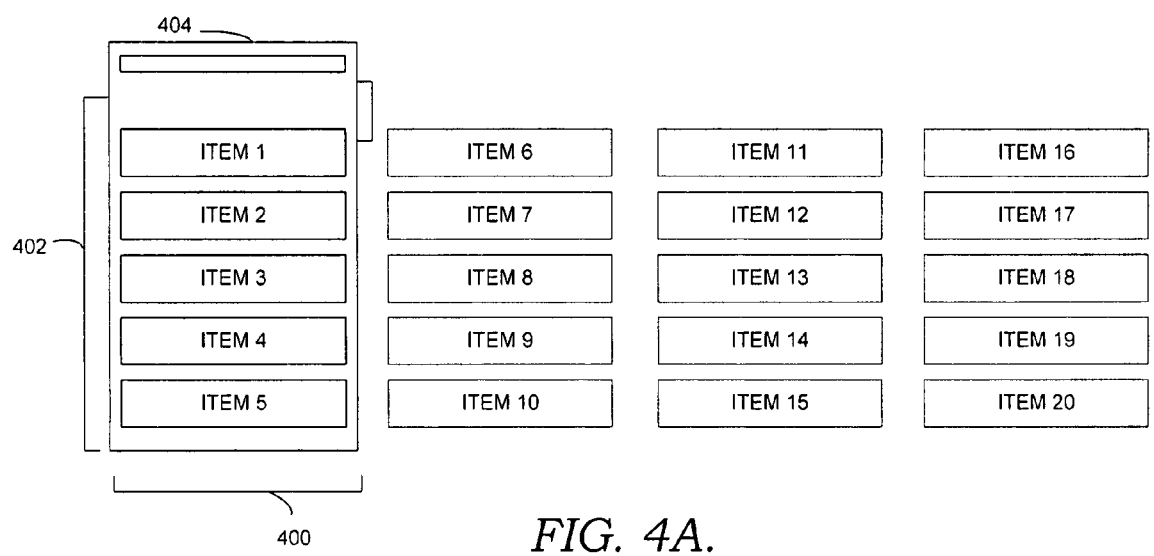
FIG. 4A is a first display of a graphical user interface for applying a content navigational mode, in accordance with an embodiment of the present invention.
Figure 4B:
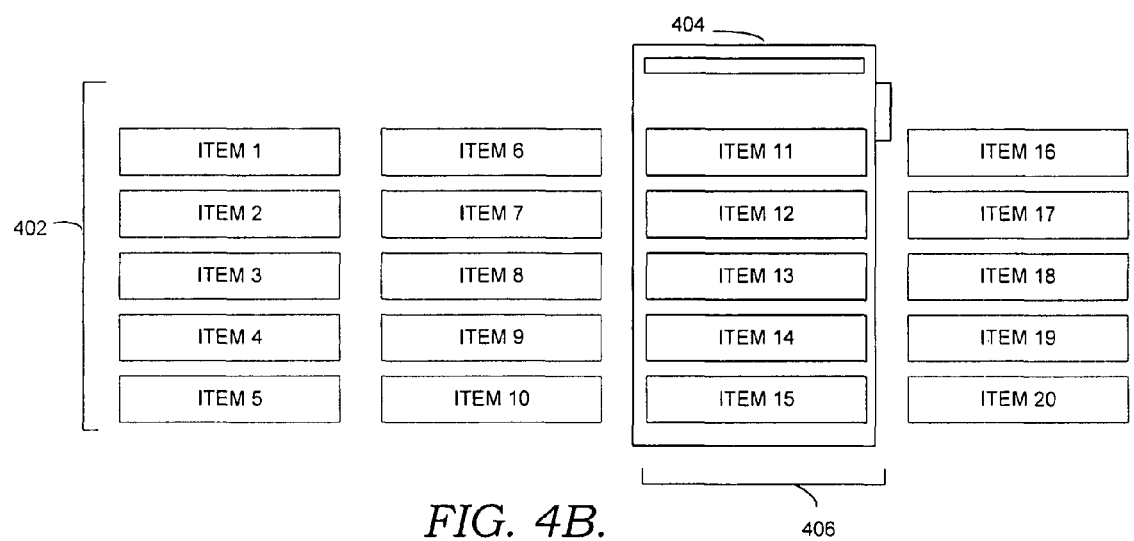
FIG. 4B is a second display of a graphical user interface for applying a content navigational mode, in accordance with an embodiment of the present invention.
Figure 5:
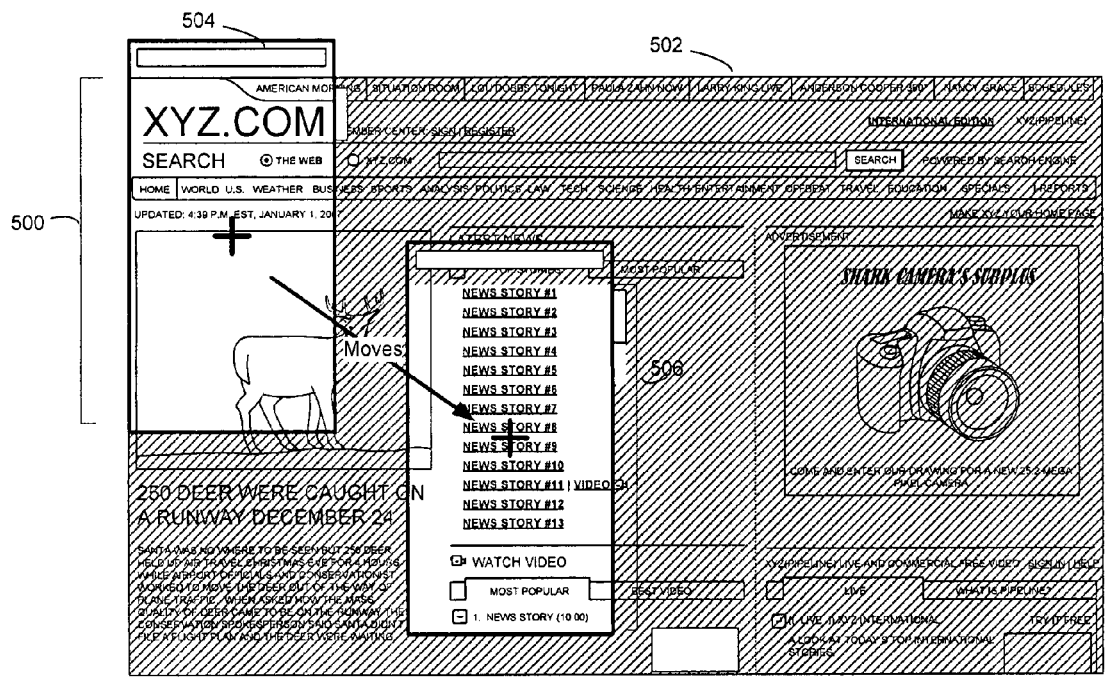
FIG. 5 is an exemplary display of a graphical user interface, in accordance with an embodiment of the present invention, for applying a content navigational mode to a two-dimensional content display screen feature.

A content navigational mode maintains a content display screen feature in a virtually fixed position upon a device motion event. By way of example, with reference to FIG. 4A, a user is viewing a first portion 400 of a content display screen feature 402 comprising a two dimensional list. Assume the device 404 is moved to the right while a content navigational mode is applied to the device 404. As shown in FIG. 4B, the content display screen feature 402 remains virtually fixed, and the user may view a third portion 406 of the content display screen feature 402. By way of further example, with reference to FIG. 5, a user views a first portion 500 of a content display screen feature 502 comprising a webpage. Assume the device 504 is moved towards the user and to the right while the device 504 is in content navigational mode. The content display screen feature 502 remains virtually fixed, and the user may view a second portion 506 of the content display screen feature 502.

Figure 6A:
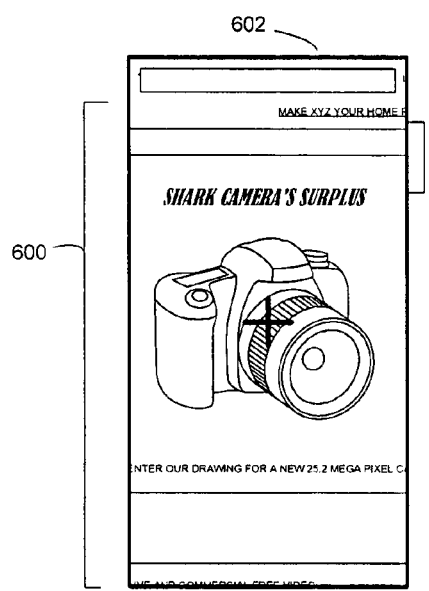
FIG. 6A is a first display of a graphical user interface for applying a content navigational mode based on a rotational device motion event, in accordance with an embodiment of the present invention.
Figure 6B:
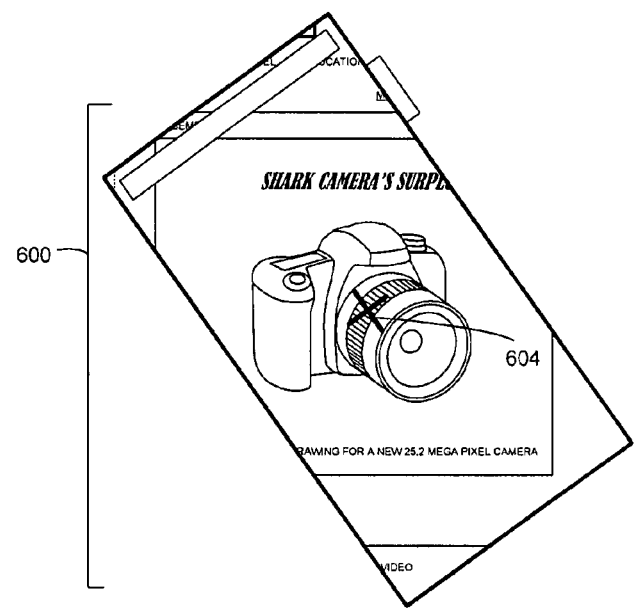
FIG. 6B is a second display of a graphical user interface for applying a content navigational mode based on a rotational device motion event, in accordance with an embodiment of the present invention.

Referring now to FIGS. 6A-6B and FIGS. 7A-7C, a content display screen feature remains virtually fixed upon a rotational device motion event. More specifically, with reference to FIG. 6A, a user views a content display screen feature 600 comprising a webpage. Assume a device 602 is rotated counterclockwise while a content navigational mode is applied to the device 602. As shown in FIG. 6B, the content display screen feature 600, i.e., the webpage, remains virtually fixed while the selector 604 rotated in accordance with the rotational device motion event.

Figure 7A:
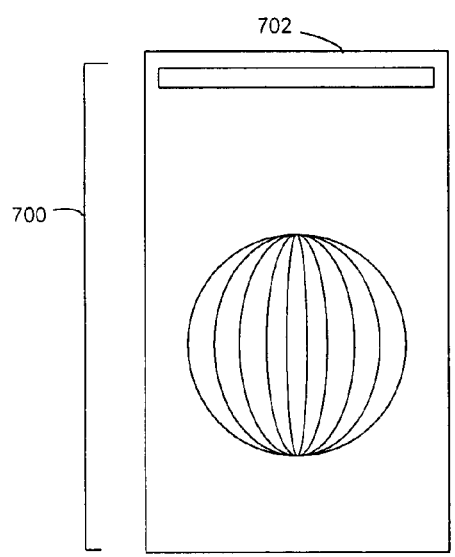
FIG. 7A is a first display of a graphical user interface for applying a content navigational mode based on a three-dimensional rotational device motion event, in accordance with an embodiment of the present invention.
Figure 7B:
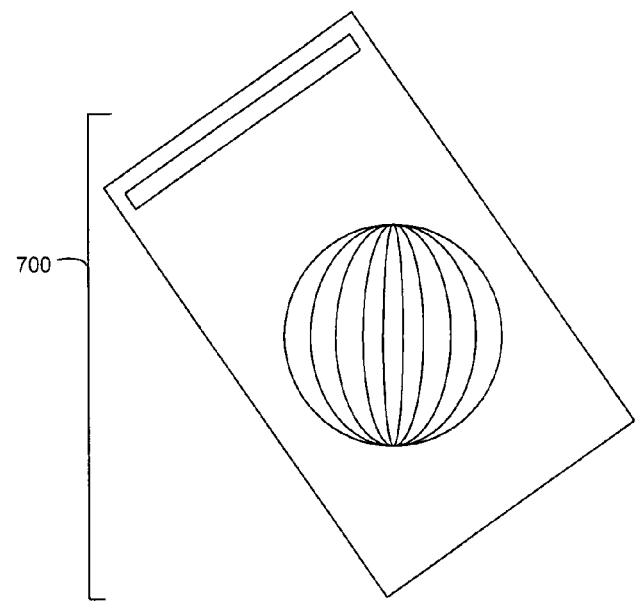
FIG. 7B is a second display of a graphical user interface for applying a content navigational mode based on a three-dimensional rotational device motion event, in accordance with an embodiment of the present invention.
Figure 7C:
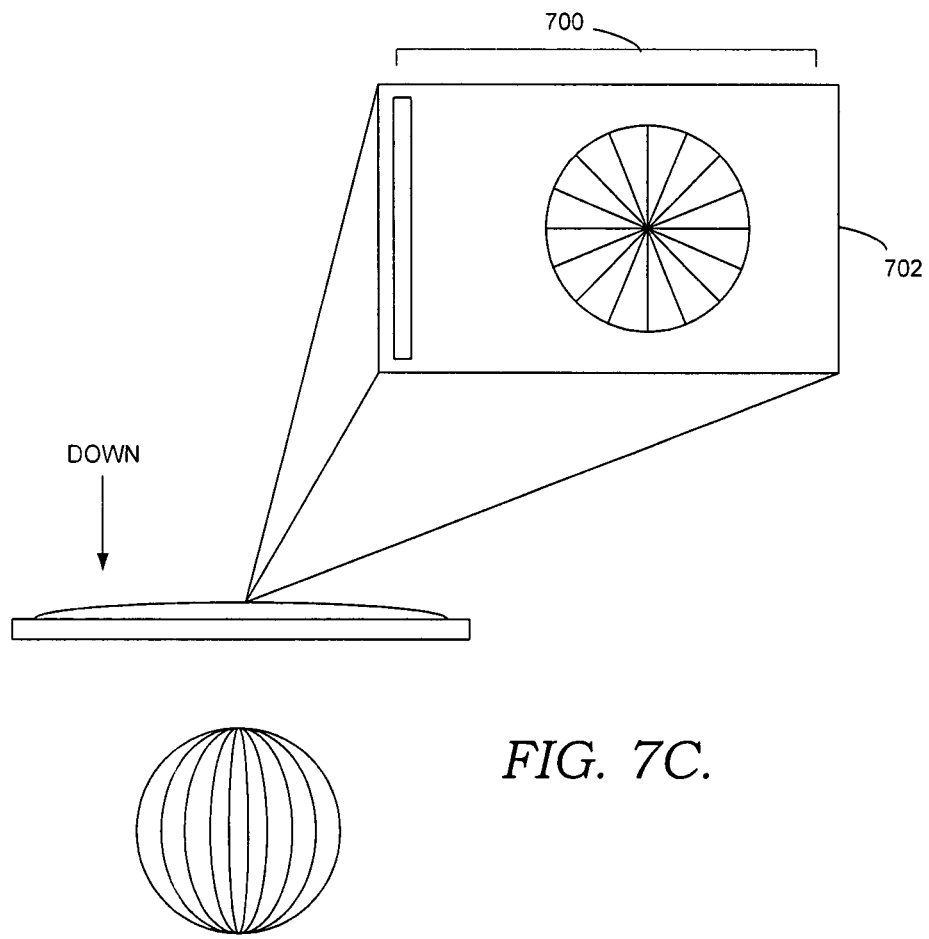
FIG. 7C is a third display of a graphical user interface for applying a content navigational mode based on a three-dimensional rotational device motion event, in accordance with an embodiment of the present invention.

With reference to FIG. 7A, a user views a content display screen feature 700 comprising an image. Assume a device 702 is rotated counterclockwise while a content navigational mode is applied to the device 702. As shown in FIG. 7B, the content display screen feature 700, i.e., the image, remains virtually fixed. Assume further that the device is rotated on the x, y, and z axis while a content navigational mode is applied to the device 702. As shown in FIG. 7C, the content display screen feature 700 remains virtually fixed where the device 702 rotated on the x, y, and z axis. One skilled in the art will appreciate that a three-dimensional device motion event may result in rotating around the center of object, as illustrated in FIGS. 7A-7C. Alternatively, a three-dimensional device motion event may result in "free" movement. That is, the device may display content facing outwardly from an object.

In another embodiment, a navigational mode may be based on the manipulation of a display screen feature. As such, a navigational mode may comprise a discrete navigational mode, a continuous navigational mode, a capture navigational mode, a menu navigational mode, a selection navigational mode, or any other mode that specifies how to manipulate a display screen feature.

A discrete navigational mode manipulates a display screen feature by navigating the display screen feature discretely, e.g., in portions. That is, the display screen feature moves in distinct portions. One skilled in the art will recognize that the portions may be of any size or dimension. For example, referring again to FIG. 4A, a user views only a first portion 400 of a content display screen feature 402 comprising a two dimensional list. Assume the device 404 is moved to the right while a discrete navigational mode is applied to the device 404. As shown in FIG. 4B, where a discrete navigational mode is applied to the device 404, the content display screen feature 402 is manipulated such that only a third portion 406 of the content display screen feature 402 is displayed.

Figure 4C:
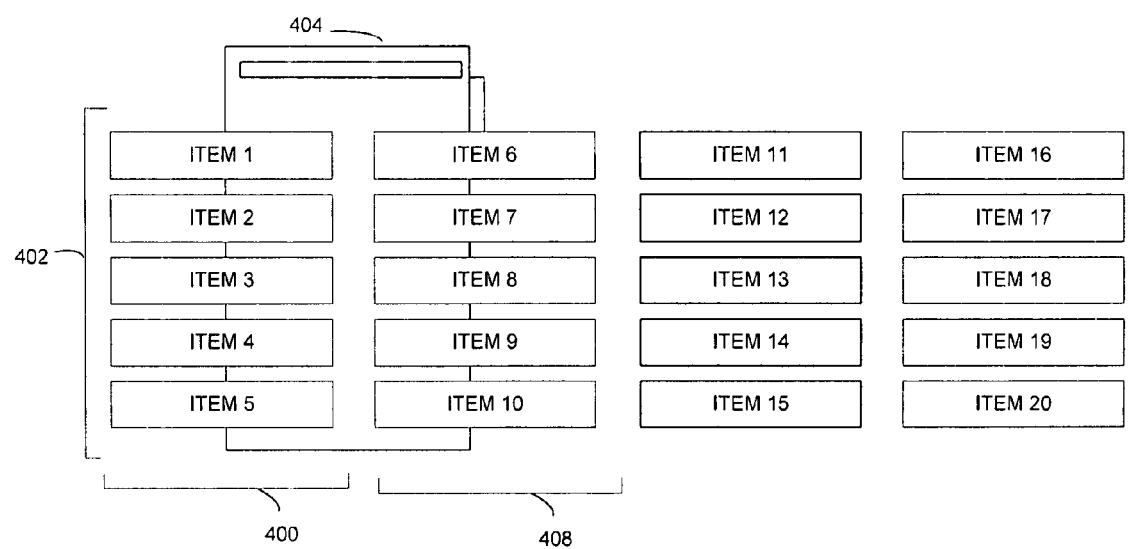
FIG. 4C is a third display of a graphical user interface for applying a content navigational mode, in accordance with an embodiment of the present invention.

A continuous navigational mode manipulates a display screen feature by navigating the display screen feature continuously. As such, the display screen feature is characterized as continuous and manipulated accordingly. For example, with continued reference to FIG. 4A, a user views only a first portion 400 of a content display screen feature 402 comprising a two dimensional list. Assume the device 404 is moved to the right while a continuous navigational mode is applied to the device 404. As shown in FIG. 4C, where a continuous navigational mode is applied to the device 404, the content display screen feature 402 is continuously manipulated such that a portion of both the first portion 400 and a second portion 408 of the content display screen feature 402 is displayed. One skilled in the art will recognize that the display screen feature may be manipulated in a one-to-one proportion or a one-to-many proportion. In an embodiment where a one-to-one proportion is employed and a device is moved one inch, the display screen feature may also be manipulated in the same proportion, i.e., one inch. In an embodiment where a one-to-many proportion is employed and a device is moved one inch, the display screen feature may be manipulated by a different proportion, such as, for example, one-fifth of an inch.

A static navigational mode manipulates a display screen feature by locking the portion of a display screen feature that is displayed such that the locked portion is not manipulated upon a device motion event. For example, assume that a user is navigating through a content display screen feature, such as a web page, via device motion events and/or device action events. Upon applying a static navigational mode to the device, the portion of the web page that is displayed on the display screen is locked such that moving the device does not further manipulate the web page. In one embodiment, the static navigational mode may only lock the portion of a content display screen feature displayed on the display screen such that another display screen feature, e.g., focus display screen feature or selector display screen feature, may be manipulated via a device motion event within the locked portion of the content display screen feature.

The menu navigational mode manipulates a display screen feature by presenting a context menu within the display screen. Such a context menu may be based on a selected content display screen feature. Where a menu navigational mode is applied to a device along with a second navigational mode, such as focus navigational mode, the second navigational mode may continue to be applied for manipulation within the context menu.

A selection navigational mode manipulates a display screen feature by navigating the display screen to present additional or alternative content based on the selection of an aspect of a content display screen feature. A selection may occur upon a device action event on a selectable item, e.g., user contacts a key or releases a key to select a selectable item while the selector hovers over the selectable item. In one embodiment, the selection navigational mode may be used to simply select a selectable item presented within the display screen, e.g., text, a hyperlink, an image, a video, a value, and the like. In another embodiment, the selection navigational mode may be used to select an item and drag the item. Such a select and drag function may be used, for example, in a desktop setting to drag an application or document to the "trash."

In yet other embodiments, a navigational mode may be based on a device motion event. In such an embodiment, a navigational mode may comprise a tilt navigational mode, a rotational navigational mode, a directional navigational mode, a gesture navigational mode, or any other mode that specifies a device motion event or a device action event.

Figure 8A:
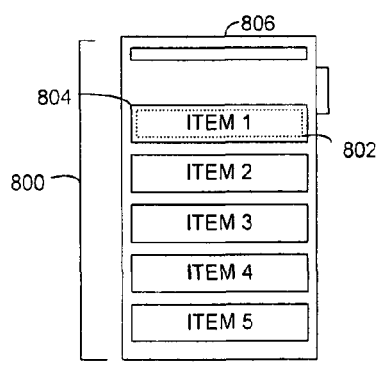
FIG. 8A is a first display of a graphical user interface, in accordance with an embodiment of the present invention, for applying a tilt navigational mode.
Figure 8B:
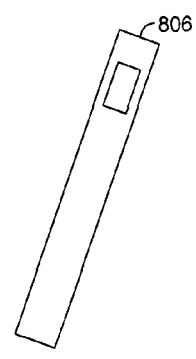
FIG. 8B is a second display for applying a tilt navigational mode, in accordance with an embodiment of the present invention.
Figure 8C:
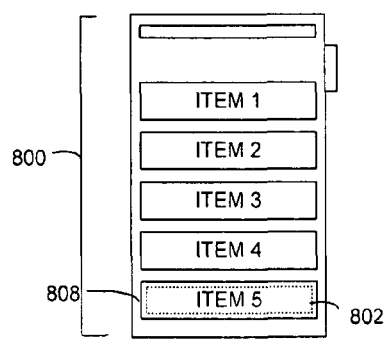
FIG. 8C is a third display of a graphical user interface for applying a tilt navigational mode, in accordance with an embodiment of the present invention.
Figure 8D:
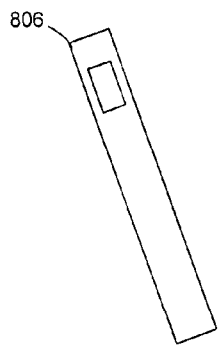
FIG. 8D is a fourth display for applying a tilt navigational mode, in accordance with an embodiment of the present invention.
Figure 8E:
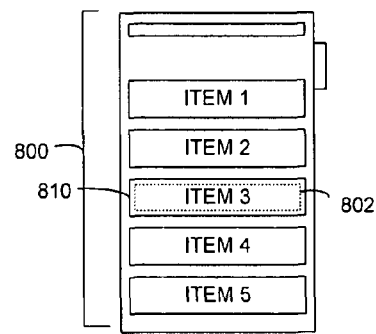
FIG. 8E is a fifth display of a graphical user interface for applying a tilt navigational mode, in accordance with an embodiment of the present invention.

A tilt navigational mode manipulates a display screen feature based on a tilt device motion event. The direction, degree, acceleration, and/or velocity of the tilt device motion event may determine the manipulation of the display screen feature. By way of example only, with reference to FIG. 8A, a user views a content display screen feature 800 comprising a vertical list. A focus display screen feature 802 is focused on the first item 804 within the content display screen feature 800. Assume the top portion of the device 806 is tilted away from the user, as shown in FIG. 8B, while a tilt navigational mode is applied to device 806. In such a case, as shown in FIG. 8C, the focus display screen feature 802 is manipulated such that the focus display screen feature 802 is focused on the fifth item 808 within the content display screen feature 800. Assume further that the top portion of the device 806 is tilted towards the user, as shown in FIG. 8C, while the tilt navigational mode is applied to device 806. In such a case, as shown in FIG. 8D, the focus display screen feature 802 is manipulated such that the focus display screen feature 802 is focused on the third item 810 within the content display screen feature 800.

A rotational navigational mode manipulates a display screen feature based on a rotational device motion event. The direction, degree, acceleration, and/or velocity of the rotational device motion event may determine the manipulation of the display screen feature. A directional navigation mode manipulates a display screen feature based on a directional device motion event, e.g., lateral, forward, backward, zoom, and the like. In such a mode, the direction, velocity, and/or acceleration of the directional device motion event may determine the manipulation of the display screen feature.

A gesture navigational mode manipulates a display screen by navigating display screen content based on a device gesture. A device gesture may comprise a brisk movement in a specific direction, a device shake, a movement in a specific pattern, and a combination thereof. In some cases, the gesture navigation mode may be based on the direction, degree, and/or velocity of the device gesture.

One skilled in the art will recognize that a navigational mode may comprise any combination of modes that manipulate a display screen. For example, a navigational mode applied to a device may comprise a combination of a content navigational mode and a continuous navigational mode.

Referring again to FIG. 1, an exemplary computing system 100 for applying a navigational mode to a device may include a state indicator obtaining component 110, a state indicator associating component 120, and a navigational mode applying component 130. In some embodiments, one or more of the illustrated components may be implemented as one or more stand-alone applications. In other embodiments, one or more of the illustrated components may be integrated directly into an operating system or an application of a server and/or a device, or other equipment associated therewith. It will be understood by those of ordinary skill in the art that the components illustrated in FIG. 1 are exemplary in nature and in number and should not be construed as limited. Any number of components may be employed to achieve the desired functionality within the scope of embodiments hereof.

The state indicator obtaining component 110 is configured to obtain one or more state indicators. A state indicator provides an indication of a state of a navigational mode selector. A navigational mode selector, as used herein, refers to any feature utilized to select a navigational mode. Such a navigational mode selector may include, without limitation, a key, a button, an input component, a scroll ball, a voice/audio recognition feature, any other selection feature, or a combination thereof. One skilled in the art will recognize that a device may have a single navigational mode selector or a plurality of navigational mode selectors. In an embodiment where a device includes a single navigational mode selector, the navigational mode selector may be used to select among multiple navigational modes. Accordingly, such a navigational mode selector may have multiple states. In an embodiment where a device includes multiple navigational mode selectors, each of the navigational mode selectors may be used to select the same navigational mode or series of navigational modes or, alternatively, each of the navigational mode selectors may be used to select a different navigational mode.

A state of a navigational mode selector may refer to a particular configuration associated with the navigational mode selector. A state indicator indicating the state of a navigational mode selector may comprise text, a value, a symbol, a signal, a resistance, a voltage, a pressure, a location, a temperature, and the like. Such a value indicating a state of a navigational mode selector may be a value associated with the number of instances a navigational mode selector has been utilized within a specific time duration, prior to a specific time, or prior to the occurrence of a specific event, e.g., device shuts down, device enters sleep mode, application discontinued, and the like.

In one embodiment, one or more contact sensors may be used to indicate a state of a navigational mode selector. Such contact sensors detect contact and may comprise, without limitation, pressure or displacement sensors, bio-presence sensors, and the like. A pressure or displacement sensor may be associated with any key on a device, e.g., a key within a conventional keypad or any other key. Such a key employs one or more pressure or displacement sensors to capture input provided by a user. A bio-presence sensor may be any type of sensor that detects human touch, such as a heat sensor, an electrical conductivity measuring sensor, an ultrasound sensor, or other sensors that detect touch. A bio-presence sensor may be associated with one or more keys on a device, a region or portion of a keypad, with a pressure or displacement sensor, or any portion of a device. In an embodiment where contact sensors are used to indicate a state of a navigational mode selector, one skilled in the art will appreciate that in instances where contact sensors fail to indicate a state of a navigational mode selector, a default state utilized.

Notwithstanding the type of contact sensor or other feature utilized to indicate a state of a navigational mode selector, the contact sensor may be calibrated to generate a signal based on a certain "profile" generally accepted as being representative of a sufficient contact. For example, if a heat sensor measures a certain temperature, or a temperature of one particular heat sensor is measured as higher than other heat sensors of the device, the signal generated by the sensor or sensors may be used to determine when the signals are representative of a sufficient contact. Similarly, the sensors may respond to a particular electrical conductivity profile associated with touch by a user's finger, and if a threshold conductivity value is reached, or is measured within a particular range of values, a signal is generated and used to determine when the signals are representative of a sufficient contact. The sensors may be configured to generate signals based on direct human touch on the keypad, or touch through a thin object, such as glove liners, or touch with a device. As one skilled in the art can appreciate, the sensitivity of the bio-presence sensors implemented affect when a human touch condition is registered.

Figure 9:
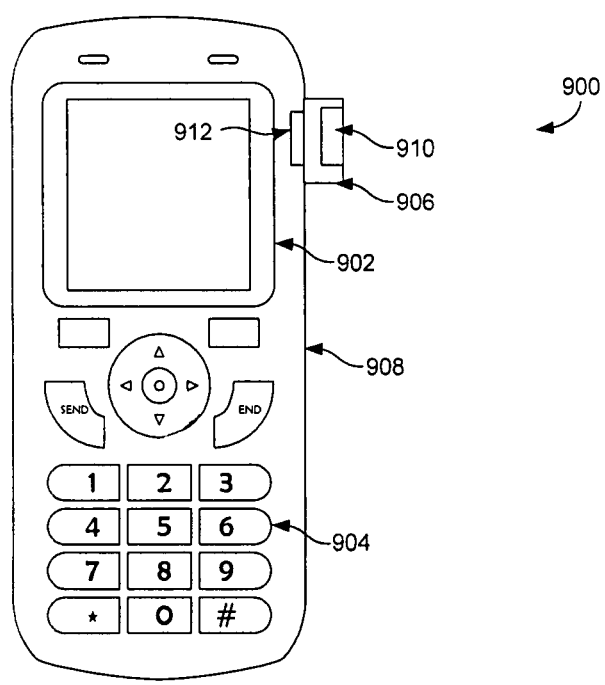
FIG. 9 is a schematic view of an exemplary device having a navigational mode selector, in accordance with an embodiment of the present invention.

Turning to FIG. 9, a device 900, in the form of a mobile phone, is depicted as an environment in which contact sensors are used to indicate a state of a navigational mode selector. The device 900 includes a display screen 902, a primary keypad 904, and a navigational mode selector 906. The primary keypad 904 and the navigational mode selector 906 are formed to face outwardly from a frame 908 of the device 900. The navigational mode selector 906 includes a bio-presence sensor 910 and a pressure or displacement sensor 912. The bio-presence sensor 910 may be any type of sensor that detects human touch, such as a heat sensor, an electrical conductivity measuring sensor, an ultrasound sensor, or other sensors.

Such a device 900 having a single navigational mode selector 906 may have, for example, three states and, as such, may be used to select among three navigational modes. By way of example only, assume a user is holding device 900 without touching the navigational mode selector 906. In such a case, the navigational mode selector 906 has a first state, e.g., a default state. At a later time, the user places a finger on the navigational mode selector 906 such that the bio-presence sensor 910 generates a signal indicating a second state, e.g., a touched stated, of the navigational mode selector 906. Finally, the user depresses the navigational mode selector 906 such that pressure or displacement sensor 912 generates a signal. Upon depressing the navigational mode selector 906, the navigational mode selector 906 has a third state, e.g., a depressed state. Such a depressed state may be associated with a selection navigational mode such that an aspect of a content display screen feature is selected.

A state indicator may be generated automatically. In such an embodiment, a state indicator may be automatically generated upon the occurrence of a specific time, a specific time duration, or a specific event, e.g., device is activated, device detects a motion, device exits sleep mode, and the like. Alternatively, a state indicator may be generated based on user input. For example, a state indicator may be generated upon a user's selection of a navigational mode selector. Where a navigational mode selector is selected, e.g., a key is contacted, and a contact sensor is used to indicate the state, the state indicator may comprise text, a value, e.g., the number of instances a contact sensor generates a signal, a symbol, a signal, a resistance, a voltage, a pressure, a location, a temperature, and the like.

The state indicator obtaining component 110 may obtain a state indicator by receiving, retrieving, identifying, or determining state indicators. One skilled in the art will recognize that any number of state indicators may be obtained by state indicator obtaining component 110. In embodiments where the state indicator obtaining component 110 receives or retrieves state indicators and a contact sensor is used to indicate the state of a navigational mode selector, the state indicator obtaining component 110 may receive or retrieve one or more state indicators generated from a contact sensor or processed by a processor upon contact with the sensor. As such, the signal generated by the contact sensor may be communicated to the state indicator obtaining component 110 such that the state indicator obtaining component 110 may obtain one or more state indicators.

In an embodiment where the state indicator obtaining component 110 identifies or determines state indicators, the state indicator obtaining component 110 may utilize a contact sensor to identify or determine one or more state indicators. For example, a contact sensor may generate and communicate a signal to the state indicator obtaining component 110. Such a signal may be used by the state indicator obtaining component 110 to identify or determine a state indicator. Alternatively, the state indicator obtaining component 110 may include a contact sensor that is utilized to identify or determine state indicators.

The state indicator associating component 120 is configured to associate one or more state indicators, such as a state indicator obtained by state indicator obtaining component 110, with a navigational mode. One skilled in the art will recognize that any number of state indicators may be associated with a navigational mode. In an embodiment where a single state indicator is obtained by state indicator obtaining component 110, the single state indicator obtained may be associated with a navigational mode. In an embodiment where multiple state indicators are obtained by state indicator obtaining component 110, each of the multiple state indicators obtained may be associated with a navigational mode.

The state indicator associating component 120 may utilize an algorithm and/or a lookup system to associate one or more state indicators with a navigational mode. In one embodiment, state indicator associating component may associate state indicators with a navigational mode based on a predetermined association. For example, assume a navigational mode selector, e.g., a key, is associated with both a bio-presence contact sensor and a displacement contact sensor. In such a case, a state indicator comprising a signal from the bio-presence contact sensor may be associated with a first navigational mode, while a state indicator comprising a signal from the displacement contact sensor may be associated with a second navigational mode. Accordingly, each time a state indicator comprising a signal from the bio-presence contact sensor is obtained by state indicator obtaining component 110, the state indicator is associated with the first navigational mode. Similarly, each time a state indicator comprising a signal from the displacement contact sensor is obtained by state indicator obtaining component 110, the state indicator is associated with the second navigational mode.

In an alternative embodiment, state indicator associating component 120 may dynamically associate one or more state indicators with a navigational mode. In embodiments, where a state indicator associating component 120 dynamically associates state indicators with a navigational mode, the association may be based on, among other things, the state indicator; the rendered content, e.g., a website or a list; the application; or the device motion event or device action event. For example, assume a navigational mode selector, e.g., a key, is associated with a displacement contact sensor. In such a case, upon obtaining a state indicator, the state indicator associating component 120 may dynamically associate the state indicator with a navigational mode. Alternatively, the state indicator associating component 120 may identify the device motion event or device action event and, based on the event, dynamically associate the state indicator with a navigational mode.

The navigational mode applying component 130 is configured to apply a navigational mode to a device. Upon the application of a navigational mode to a device, the device may manipulate a display screen feature in accordance with one or more device motion events or device action events. In one embodiment, a navigational mode may be applied to a device for the duration of a state of a navigational mode selector. For example, assume a navigational mode selector, e.g., a key, on a device is associated with a bio-presence contact sensor, and a user places a finger on the bio-presence contact sensor. Throughout the duration of the state of the navigational mode selector, e.g., the duration the user has a finger placed on the bio-presence contact sensor, a specific navigational mode may be applied to the device. The navigational mode may continue to be applied to the device until the user removes the finger from the bio-presence contact sensor or changes the contact such that the contact is no longer an acceptable contact.

In another embodiment, a navigational mode may be applied until the occurrence of a specific event. In such an embodiment, a default navigational mode or user contact with a navigational mode selector may initiate the application of a navigational mode to a device, and the navigational mode may continue until the occurrence of an event, even if the user discontinues contact with the navigational mode selector. For example, assume a user's contact with a navigational mode selector applies a navigational mode to a device. In such an embodiment, the navigational mode applied to the device may remain activated until it is deactivated by the occurrence of a specific event. Specific events that may deactivate a navigational mode may include an indication or selection by a user to deactivate a navigational mode or to utilize another navigational mode. Alternatively, specific events that may deactivate a navigational mode may also include the expiration of a specific time duration or any other measurement of time, closing an application, opening a new application, and the like.

Figure 10:
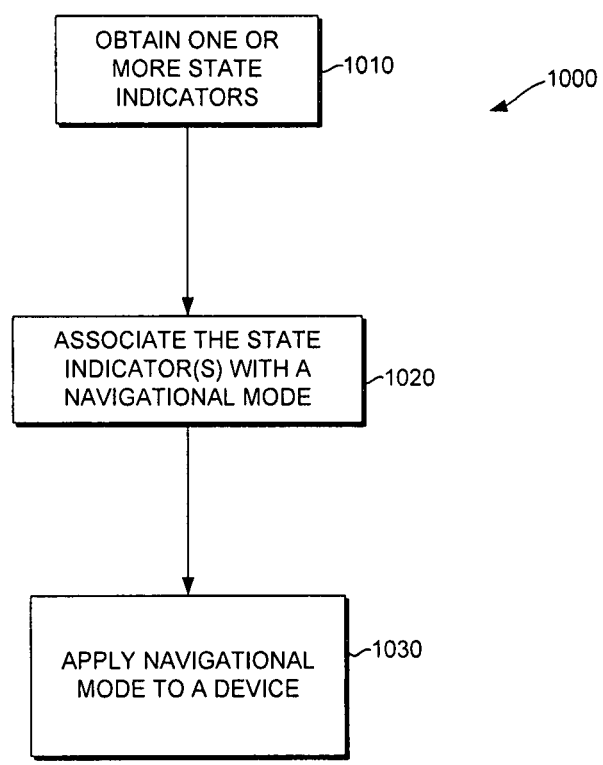
FIG. 10 is a flow diagram illustrating an exemplary method for applying a navigational mode to a device based on one or more state indicators, in accordance with an embodiment of the present invention.

With reference to FIG. 10, a flow diagram is shown illustrating a method 1000 for applying a navigational mode to a device based on one or more state indicators, in accordance with an embodiment of the present invention. Initially, as indicated at block 1010, one or more state indicators are obtained. Such state indicators indicate the state of a navigational mode selector. Subsequently, the one or more obtained state indicators are associated with a navigational mode at block 220. At block 230, the navigational mode is applied to a device.

By way of example only, with reference to FIGS. 11A-11D and 12A-12D, applying a navigational mode to a device based on one or more state indicators utilizing a navigational mode selector is illustrated, in accordance with an embodiment of the present invention. For each of FIGS. 11A-11D and 12A-12D, assume the navigational mode selector is a key positioned on a side of a device that is associated with both a bio-presence contact sensor and a displacement contact sensor.

Figure 11A:
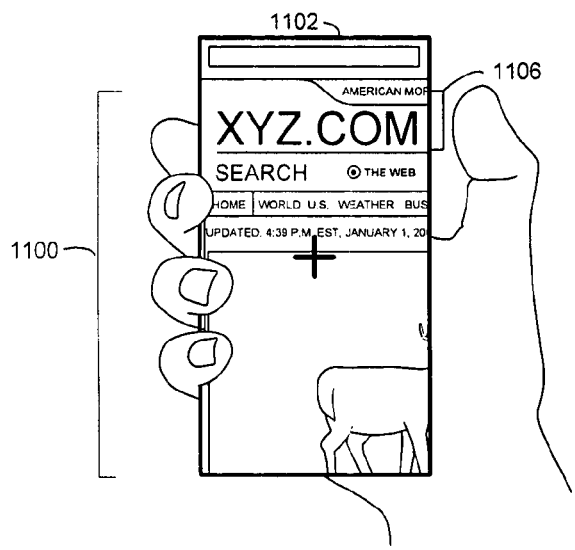
FIG. 11A is a first display of a graphical user interface for applying a navigational mode selector to navigate a search display feature, in accordance with an embodiment of the present invention.
Figure 11B:
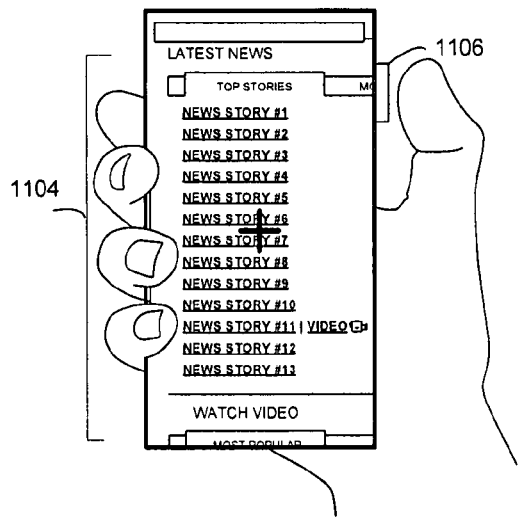
FIG. 11B is a second display of a graphical user interface for applying a navigational mode selector to navigate a search display feature, in accordance with an embodiment of the present invention.
Figure 11C:
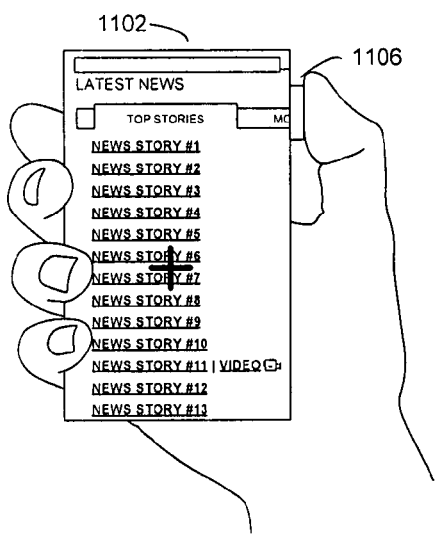
FIG. 11C is a third display of a graphical user interface for applying a navigational mode selector to navigate a search display feature, in accordance with an embodiment of the present invention.
Figure 11D:
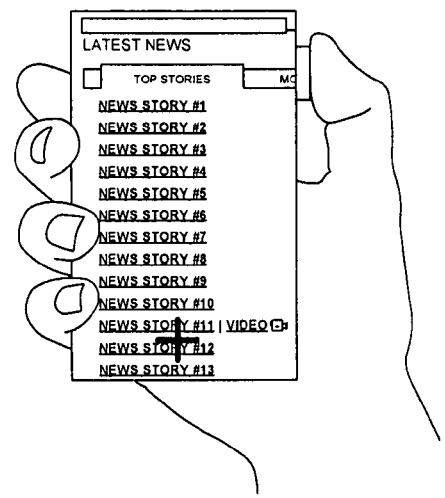
FIG. 11D is a fourth display of a graphical user interface for applying a navigational mode selector to navigate a search display feature, in accordance with an embodiment of the present invention.

With reference to FIG. 11A, a user views a first portion 1100 of a content display screen feature comprising a webpage. Assume state indicator obtaining component 110 of FIG. 1 obtains a state indicator indicating a default state as the navigational mode selector 1106 is not contacted, and the default state is associated with a content navigational mode. Further assume a device motion event is detected in which the device 1102 moves toward the user and to the right while the content navigational mode is applied to the device 1102. As shown in FIG. 11B, the content display screen feature remains virtually fixed, and the user may view a second portion 1104 of the content display screen feature. After navigating the webpage, the user contacts the navigational mode selector 1106, as shown in FIG. 11C. Assume a state indicator indicates a second state, e.g., a contact state, and the second state is associated with a selector navigational mode. Further assume a device motion event is detected in which the device 1102 moves away from the user while the selector navigational mode is applied to the device 1102. As shown in FIG. 11D, the selector display screen feature remains virtually fixed.

Figure 12A:
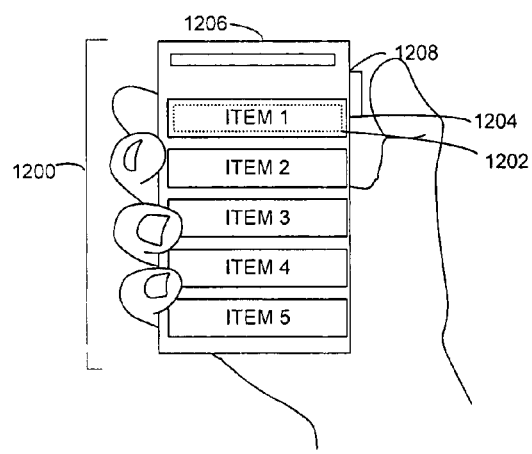
FIG. 12A is a first display of a graphical user interface, in accordance with an embodiment of the present invention, for applying a navigational mode selector to navigate and select a search display feature.
Figure 12B:
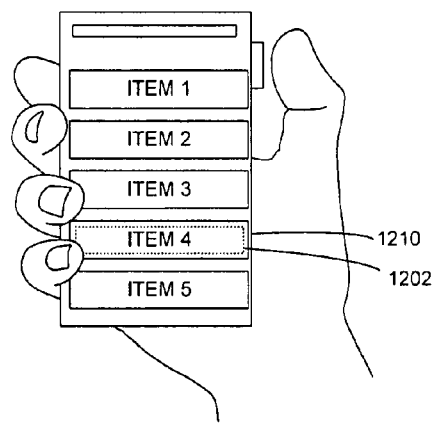
FIG. 12B is a second display of a graphical user interface for applying a navigational mode selector to navigate and select a search display feature, in accordance with an embodiment of the present invention.
Figure 12C:
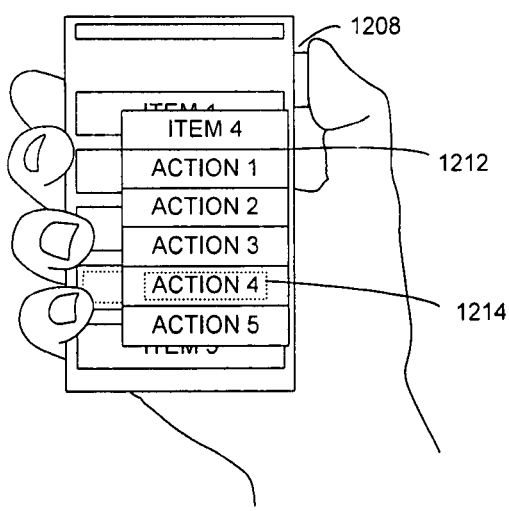
FIG. 12C is a second display of a graphical user interface for applying a navigational mode selector to navigate and select a search display feature, in accordance with an embodiment of the present invention.
Figure 12D:
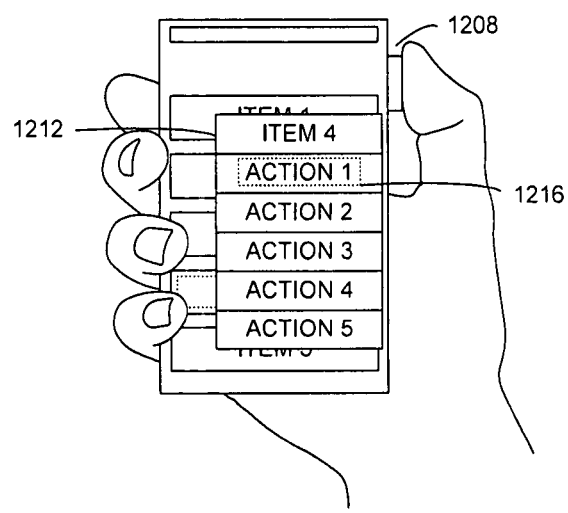
FIG. 12D is a second display of a graphical user interface for applying a navigational mode selector to navigate and select a search display feature, in accordance with an embodiment of the present invention.

Referring now to FIG. 12A, a user views a content display screen feature 1200 comprising a vertical list. Assume state indicator obtaining component 110 of FIG. 1 obtains a state indicator indicating a default state because the navigational mode selector 1208 is not contacted, and the default state is associated with a focus navigational mode. A focus display screen feature 1202 is focused on the first item 1204 within the content display screen feature 1200. Assume the device 1206 is moved away from the user while the device 1206 is in a focus navigational mode. As shown in FIG. 12B, the focus display screen feature 1202 remains virtually fixed and, thereby, is focused on the fourth item 1210 of the content display screen feature. At a later instance, the user contacts the navigational mode selector 1208, as shown in FIG. 12C. Upon contacting the navigational mode selector 1208, a menu navigational mode is applied to the device such that a context menu 1212 is presented. The focus navigational mode may, thereafter, transfer to the context menu 1212 and focus on the fourth action 1214. The user may then navigate the content within the context menu 1212 using the focus navigational mode. As such, assume the device 1206 is moved toward the user while the device 1206 remains in a focus navigational mode. As shown in FIG. 12D, the focus remains virtually fixed and, thereby, is focused on the first action 1216 within the context menu 1212. Thereafter, the user may depress the navigational mode selector 1208 to select the first action 1216.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-executable instructions embodied thereon that, when executed, perform a method for applying navigational modes to devices based on state indicators, the method comprising:

obtaining one or more state indicators that provide an indication of a state of a navigational mode selector that is a button on a user device utilized to select a navigation mode from among a first navigational mode that manipulates a selector, that is used to select selectable items, based on motion of the user device and a second navigational mode that manipulates content, presented via a user interface of the user device, based on motion of the user device, the one or more state indicators providing an indication of a touch state that indicates the navigational mode selector is contacted by a user when the user contacts, but does not depress, the button on the user device or a depressed state that indicates the navigation mode selector is depressed by the user when the user depresses the button on the user device;

associating the one or more state indicators with the navigational mode, wherein one of the touch state or the depressed state is associated with the first navigational mode that manipulates the selector that is used to select selectable items, and the other of the touch state or the depressed state is associated with the second navigational mode that manipulates content presented via a user interface of the user device; and applying the navigational mode to a device.

2. The computer-readable media of claim 1, wherein the navigational mode comprises a distinct operation within a computer program that manipulates the one or more display screen features based on one or more device motion events, one or more device action events, or a combination thereof.

3. The computer-readable media of claim 2, wherein the one or more device motion events comprise a movement applied to and detected by a device or other equipment associated therewith.

4. The computer-readable media of claim 3, wherein the movement comprises a lateral movement, a vertical movement, a rotational movement, a gesture, or a combination thereof.

5. The computer-readable media of claim 1, wherein the navigational mode comprises a discrete navigational mode, a continuous navigational mode, a capture navigational mode, a tilt navigational mode, a rotational navigational mode, a gesture navigational mode, a menu navigational mode, a selection navigational mode, or a combination thereof.

6. The computer-readable media of claim 1, wherein the one or more state indicators comprise text, a value, a symbol, a signal, a resistance, a voltage, a pressure, a location, a temperature, or a combination thereof.

7. The computer-readable media of claim 1, wherein the navigational mode selector comprises a key.

8. The computer-readable media of claim 1, wherein one or more contact sensors are used to indicate the state of the navigational mode selector.

9. The computer-readable media of claim 8, wherein the one or more contact sensors comprise a pressure sensor, a displacement sensor, a bio-presence sensor, or a combination thereof.

10. A system for applying navigational modes to devices based on state indicators, the system comprising:

a processing unit; and a memory for storing computer-executable instructions that when executed by the processing unit executes:

a state indicator obtaining component configured to obtain one or more state indicators that provide an indication of a state of a navigational mode selector comprising a key on a user device utilized to select a navigational mode from among a first navigational mode that manipulates a selector, that is used to select selectable items, based on motion of the user device and a second navigational mode that manipulates content, presented via a user interface of the user device, based on motion of the user device, the one or more state indicators providing an indication of a touch state that indicates the navigational mode selector is contacted by a user when the user touches, but does not depress, the key on the user device or a depressed state that indicates the navigation mode selector is depressed by the user when the user depresses the key on the user device;

a state indicator associating component configured to associate the one or more state indicators with the navigational mode, wherein one of the touch state or the depressed state is associated with the first navigational mode that manipulates the selector that is used to select selectable items, and the other of the touch state or the depressed state is associated with the second navigational mode that manipulates content presented via a user interface of the user device; and a navigational mode applying component configured to apply the navigational mode to a device.

11. The system of claim 10, wherein the navigational mode comprises a distinct operation within a computer program that manipulates the one or more display screen features based on one or more device motion events.

12. The system of claim 11, wherein the one or more device motion events comprise a movement applied to and detected by the device or other equipment associated therewith.

13. The system of claim 12, wherein the movement comprises a lateral movement, a vertical movement, a rotational movement, a gesture, or a combination thereof.

14. The system of claim 10, wherein the navigational mode comprises a discrete navigational mode, a continuous navigational mode, a lock navigational mode, a tilt navigational mode, a rotational navigational mode, a gesture navigational mode, or a combination thereof.

15. The system of claim 10, wherein the one or more state indicators comprise text, a value, a symbol, a signal, a resistance, a voltage, a pressure, a location, a temperature, or a combination thereof.

16. The system of claim 10, wherein the navigational mode selector comprises one or more contact sensors.

17. The system of claim 16, wherein the one or more contact sensors comprise a pressure sensor, a displacement sensor, a bio-presence sensor, or a combination thereof.

18. One or more non-transitory computer-readable media having computer-executable instructions embodied thereon that, when executed, perform a method for applying navigational modes to devices based on state indicators, the method comprising:

obtaining a first state indicator from a bio-presence sensor that indicates a touch state of a navigational mode selector comprising a button on a user device indicating that the navigational mode selector utilized to select a navigational mode from among a set of navigational modes is touched by a user, wherein each of the navigational modes comprises a distinct operation within a computer program that manipulates at least one display screen feature in accordance with motion of the user device, the at least one display screen feature comprises a content display screen feature, a focus display screen feature, or a selector display screen feature;

associating the first state indicator that indicates the touch state of the button on the user device with a first navigational mode for manipulating content presented on a display screen of the user device based on the indication of the touch state of the navigational mode selector that the navigational mode selector is touched by the user;

applying the first navigational mode to the user device such that a content is manipulated based on motion of the user device;

during the first navigational mode being applied to the device, obtaining a second state indicator from a pressure or displacement sensor that indicates a depressed state of the navigational mode selector comprising the button on the user device indicating that the navigational mode selector is depressed by the user;

associating the second state indicator that indicates the depressed state of the button on the user device with a second navigational mode for manipulating a cursor presented on the display screen of the user device based on the indication of the depressed state of the navigational mode selector that the navigational mode selector is depressed by the user;

and applying the second navigational mode to the user device such that the cursor is manipulated based on motion of the user device.

19. The computer-readable media of claim 18, wherein the first state indicator indicates a default state of the navigational mode selector.

* * * * *